United States Patent [19]

Gyulavári

[11] Patent Number: 4,533,470
[45] Date of Patent: Aug. 6, 1985

[54] APPARATUS FOR TREATING LIQUIDS

[75] Inventor: Imre Gyulavári, Debrecen, Hungary

[73] Assignee: Novex Találmányfejlesztö és Értékesitö Külkereskedelmi Rt., Budapest, Hungary

[21] Appl. No.: 355,542

[22] PCT Filed: Jun. 30, 1981

[86] PCT No.: PCT/HU81/00027
§ 371 Date: Mar. 1, 1982
§ 102(e) Date: Mar. 1, 1982

[87] PCT Pub. No.: WO82/00134
PCT Pub. Date: Jan. 21, 1982

[30] Foreign Application Priority Data

Jul. 3, 1980 [HU] Hungary .............................. 1653/80

[51] Int. Cl.³ ........................... C02F 3/20; C02F 3/16; C02F 3/18
[52] U.S. Cl. .................. 210/96.1; 210/194; 210/195.3; 210/219; 210/521; 210/926
[58] Field of Search ............ 210/926, 194, 629, 195.3, 210/521, 522, 219, 220, 96.1, 200-202, 614

[56] References Cited

U.S. PATENT DOCUMENTS

| | | | |
|---|---|---|---|
| 3,421,626 | 1/1969 | Schramm et al. | 210/926 |
| 3,990,974 | 11/1976 | Sullins | 210/522 |
| 4,146,478 | 3/1979 | Rongved | 210/926 |
| 4,199,452 | 4/1980 | Mandt | 210/926 |
| 4,226,717 | 10/1980 | Malm | 210/926 |
| 4,303,516 | 12/1981 | Stensel et al. | 210/926 |
| 4,362,625 | 12/1982 | Beard | 210/521 |
| 4,383,922 | 5/1983 | Beard | 210/926 |

FOREIGN PATENT DOCUMENTS

| | | | |
|---|---|---|---|
| 1932640 | 2/1971 | Fed. Rep. of Germany | 210/926 |
| 2520397 | 11/1976 | Fed. Rep. of Germany | 210/926 |
| 2842651 | 4/1979 | Fed. Rep. of Germany | 210/926 |
| 2852423 | 6/1980 | Fed. Rep. of Germany | 210/926 |
| 1497043 | 1/1978 | United Kingdom | 210/926 |
| 2075856 | 11/1981 | United Kingdom | 210/926 |

Primary Examiner—Benoît Castel
Attorney, Agent, or Firm—Gabriel P. Katona

[57] ABSTRACT

The invention relates to an apparatus for the treatment of liquids, in particular for the biological purification of household sewage and/or industrial sewages containing organic contaminations, furtheron for the aeration and-/or sedimentation of liquids. In the circular, quadratic or elongated oblong basin receiving the liquid a path recurring in itself is formed by means of one or more partition walls. For moving the liquid in a horizontal and/or horizontal and vertical direction propellers and-/or rotors with a horizontal and/or vertical axle are used.

For the aeration of the liquid one or more aerators with a horizontal or vertical axle and/or one or more fixed air blowers are applied.

In sense of the invention one or more secondary sedimentators in a longitudinal arrangement or with a circular top-view, provided with oblique lamellae, are connected directly to the object or are assembled therewith.

21 Claims, 15 Drawing Figures

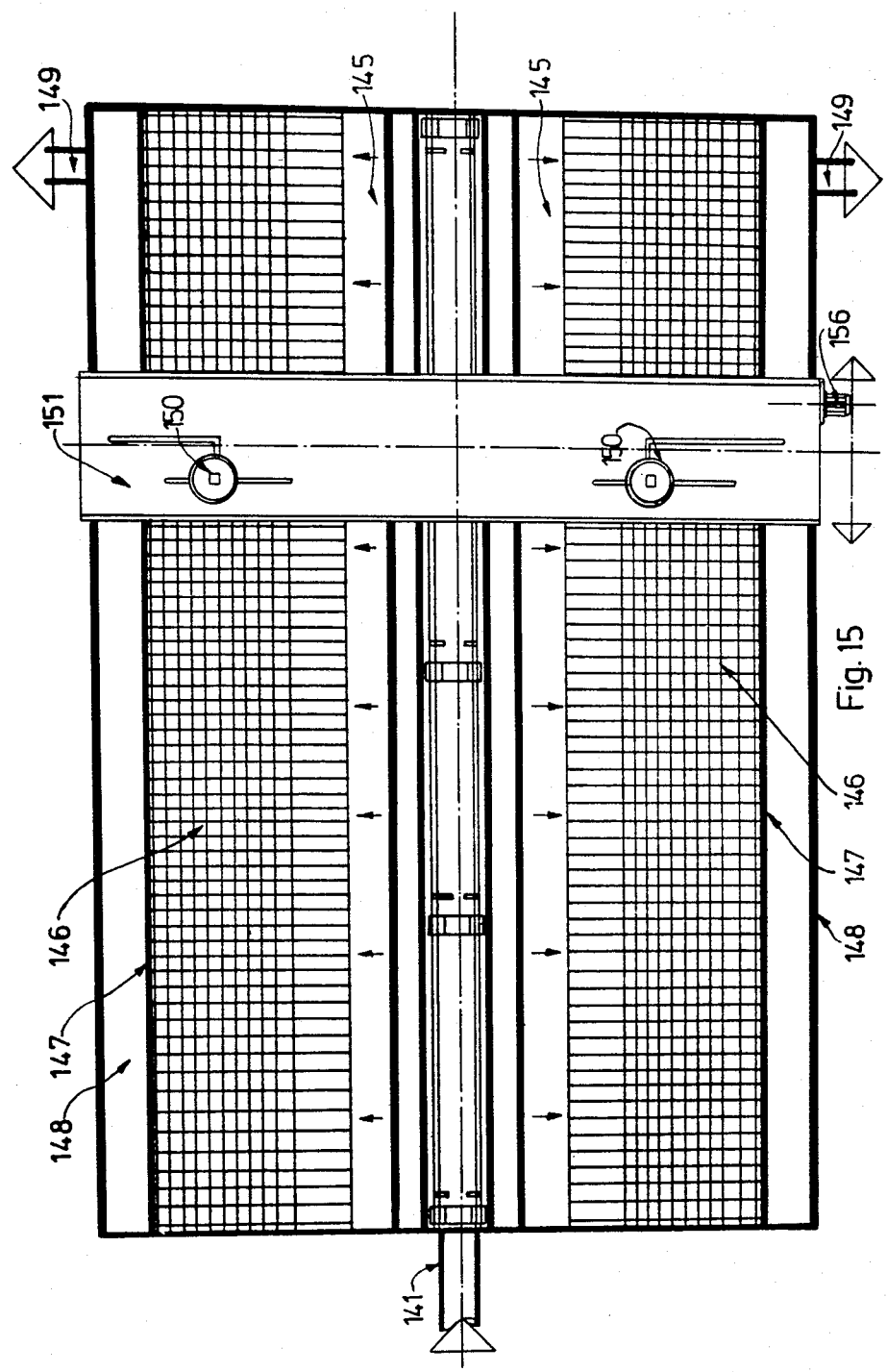

APPARATUS FOR TREATING LIQUIDS

TECHNICAL FIELD

The invention concerns an apparatus for the treatment of liquids. More particularly the invention concerns apparatus for the biological purification of household sewage and/or industrial sewages containing organic contamination. Also the apparatus of this invention causes the aeration and/or sedimentation of liquids. The apparatus comprises a circular, quadratic or elongated oblong basin for receiving the liquid wherein a path recurring to itself is formed by means of one or more partition walls. For moving the liquid in a horizontal and/or in a horizontal and vertical direction there are used one or more propellers and/or rotors with a horizontal and/or vertical axle. For the aeration of the liquid one or more aerators with a horizontal or vertical axle and/or one or more fixed air blowers are applied.

BACKGROUND ART

The so-called biological sewage treatment systems, in which dissolved organic substances are removed from the liquid or sewage are well known. In these systems the sewage is led into an aerating basin that is saturated with a mass of activated sludge with bacteria; the aerated sewage is led into a secondary sedimentation basin where the sludge is separated by sedimentation and recirculated into the aerating basin while the purified water is discharged from the system. An apparatus and a method of this kind are disclosed in Hungarian Pat. No. 166,160. These serve to circulate and aerate liquids in the course of their operation in biological sewage treatment plants i.e. oxidating trenches. In this known installation the streaming energy of the liquid to be treated is increased by means of a pump. In addition, a water jet pump is actuated by the energy of moving liquid, while air is introduced through the pump-wheel. In the course of the process the aeration step and circulation step are not separated. German Pat. No. 24 18 586 discloses apparatus in which biological sewage treatment can be carried out e.g. in a pool, wherein the water is divided into pathways by means of separation walls. In the path, in a predetermined mutual distance from each other, air-water injecting means produce a horizontal stream i.e. the water is allowed to stream in a horizontal direction. In this case aeration and circulation are not separated.

German Patent DE-OS 28 16 390 discloses a sewage treatment plant using the activated sludge process, in which several aerating trenches running parallel and connected in series are inter-connected by means of sections of circular arches (90° or 180°). At the ends of the separation walls separating the single aerating trenches, aerating wheels with a vertical axle are arranged, while in every second trench are pipe propellers with a horizontal axle. Accordingly, in this process circulation of the liquid and aeration are separated. The system is known as the Carrousel system.

The known biological sewage treatment plants using activated sludge do not solve optimally the task of aeration and sedimentation. Efficiency is low regarding both energy utilization and purification. Simultaneously space requirements are large and several drawbacks are involved in respect to operational techniques.

SUMMARY OF THE INVENTION

An object of this invention is to reduce or eliminate the disadvantages of the known plants serving for the treatment and purification of liquids, and sewage by providing an apparatus which, when compared to the known apparatus works with a higher efficiency and increased economy.

A further object is to enable the better utilization of space, the so-called intensification, which is a considerable problem worldwire. Thus, for example, on a worldwide scale several thousands of the so-called oxidizing trenches are operated, the major of which are overburdened. Accordingly, problems relating to enlarging the plants have to be confronted. Often the erection of a new installation becomes impossible because of lack of space. By using this invention, problems of said character can be successfully solved. A further object of the invention is to ensure better oxygen introduction and to promote energy savings. The objects of this invention are met by providing one or more secondary sedimentators in a longiudinal arrangement or with a circular top-view, provided with oblique lamellae connected directly to the object or assembled therewith.

The invention is based on the discovery that the objects can be accomplished insofar as biological treatment of liquids and sewages, respectively, is concerned by using a known purification system with the activated sludge and causing horizontal flow to take place in channels recurring into themselves. Simultaneously, economy of the process can be ensured by separating the oxygen introduction step and circulation step. Oxygen introduction may be automatized e.g. by changing the speed of rotation of the aerating wheel with a vertical axle.

Several further embodiments are joined with the basic embodiment detailed above resulting in efficient and economically combined apparatuses, whether they are used individually or joined.

In a preferred embodiment of the invention there is an aerating wheel with a vertical axle arranged in the basin receiving the sewage. The basin itself consists of transverse-flow aerating channels starting radially from said wheel and separated by walls lying expediently perpendicular to each other. At the ends of each of the partition walls there is arranged an aerating wheel, provided with vertical axles. In each of the channels lying behind the aerating wheels with the vertical axle there is in the direction of flow expediently a propeller with a horizontal axle. In the space between the channels lying advantageously perpendicularly to each other, there is a secondary sedimentator with oblique lamellae, showing a circular top view.

It seems to be advantageous, if at least the centrally arranged aerating wheel is operated with a speed of rotation, which can be automatically changed in dependence of the prevailing oxygen demand.

In a further advantageous embodiment of the invention an annular circular aerating channel is used, in which horizontal aerating rotors with radially arranged axles are arranged. In the middle part, with the channel there is a central secondary sedimentator with a system of oblique lamellae. Expediently, the central sedimentator is provided with a known sludge-dredger performing a rotary motion, while the oblique lamella-system is suspended onto the floats having been connected to said dredger.

The basin of the Carrousel-system known in itself can be advantageously used. In these basins at the ends of the partition walls of the parallel running aerating channels connected in series are aerating wheels with a vertical axle. In the flow direction, propellers with a horizontal axle are arranged in the channels behind said wheels. The longitudinally arranged secondary sedimentator with the oblique lamellae, in which transverse flow takes place, is connected to the aerating channels. They are expediently assembled together.

The apparatus according to this invention can be advantageously used with the known aerating trenches which are separated by a longitudinal partition wall. In one or in both branches of the trench there is an aerating rotor with a horizontal axle. In the length of the trench there is a longitudinally arranged secondary sedimentator in which the liquid streams in transverse flow. In a further preferred embodiment of the invention, longitudinally shaped secondary sedimentators each with oblique lamellae, in which transverse flow takes place, are connected to both sides of the aerating channel. The invention permits energy savings to be increased by placing vertical aerating shafts provided with air injecting grids below the horizontal aerating channels, which form a common space. The mass of the bubbles arising from the shaft travel upwards in an oblique direction in the liquid flowing in a horizontal direction. As a consequence, residence time of the bubbles in the liquid can be considerably prolonged resulting in an increased specific oxygen transfer and energy savings. In a most advantageous embodiment, the aerating shafts are formed as supporting pillars and the entire device lays on said pillars above ground level. In such a manner the area below the apparatus can be economically utilized e.g. for the emplacement of diverse auxiliary and complementary devices.

In accordance with the invention specific oxygen transfer can be further increased by placing baffle plates above the aerating shafts ascending in the direction of flow in the aerating channels i.e. trenches, in such a manner that the plates overlap each other in their vertical projection. Expediently, the angle of inclination of the baffle plates can be changed. The most advantageous value lies within the range between 1° and 45°, preferably between 2° and 5°. The baffle plates can be arranged throughout the entire height of the aeration channels or only to a partial height thereof. The baffle plates are made preferably of steel, aluminum or synthetic materials, in particular PVC, polyethylene, polypropylene or polystyrene.

Further advantages may be achieved by embossing the surface of the baffle plates. The longitudinally arranged secondary sedimentator with the oblique lamellae in which flow takes place in a transverse direction is part of the installation according to the invention and is provided with a bridge that performs a reciprocating motion in the longitudinal direction. The bridge construction carries the lamella washer and the sludge pump. Preferably, moving of the bridge construction is performed automatically and is programmed.

In a preferred embodiment of the secondary sedimentator according to the invention the sedimentator is longitudinally divided into the first sewage sedimentation space and the second sedimentation space; said spaces each contain an immersing pump. The separator with the oblique lamellae is arranged between the two spaces along the length of the device, at the center line thereof. According to a further favorable feature of the invention concrete elements are built into the lower part of the first sewage sedimentation space with a falling gradient between 45° and 60° toward the inside. Finally, in a preferred embodiment, the secondary sedimentator is formed with two sedimentation spaces with parallel side walls sloping inwards, above which the oblique lamellae are arranged. By the application of the apparatuses of the invention, several additional effects can be achieved, which cannot be achieved with the previously used apparatuses, for example, by building in the oblique baffle plates, especially if these are made of a synthetic material, specific capacity of the system using activated sludge can be considerably increased.

Due to the supply with oxygen, a biological film is formed on the surface of the synthetic materials resulting in active decomposting surface, which greatly increases the load capacity of the system.

A further advantage with regard to the vertical aerating shafts and the previously mentioned baffle plates as well, is that they can be assembled into new as well as already existing plants. As a consequence, increase of capacity can be achieved with the several thousands of oxidizing trenches in operation without further space requirements. In addition the aerating shafts may be formed of prefabricated concrete rings, which is economical and time saving.

The secondary sedimentation system being connected in a block like manner to the plant only requires an inconsiderable space thus resulting in savings in area. When the shafts are formed as supporting pillars, the area left free by the shafts can be utilized for the emplacement of e.g. an engine compartment, sludge-condenser or mechanical equipment for dehydrating the sludge etc. With the arrangement according to the invention not only is there a savings in space, but also a reduction in operational costs.

Efficiency of the longitudinally arranged secondary sedimentator provided with the oblique lamellae, in which flow takes place in a transverse direction, is considerably increased by the washer, the sludge pump and the eventually used auxiliary sludge-dredger which is mounted on the movable bridge construction. When specially formed, the basin can be suitable used as an oil and sand trap.

Thus, the apparatus according to the invention unites and combines all the advantages of the known systems, while simultaneously eliminating the drawbacks thereof.

BRIEF DESCRIPTION OF DRAWINGS

The invention is described in the accompanying drawings, wherein:

FIG. 15 is a top view of the equipment shown in FIG. 14.

DESCRIPTION OF BEST MODE OF CARRYING OUT THE INVENTION

Figure 1:
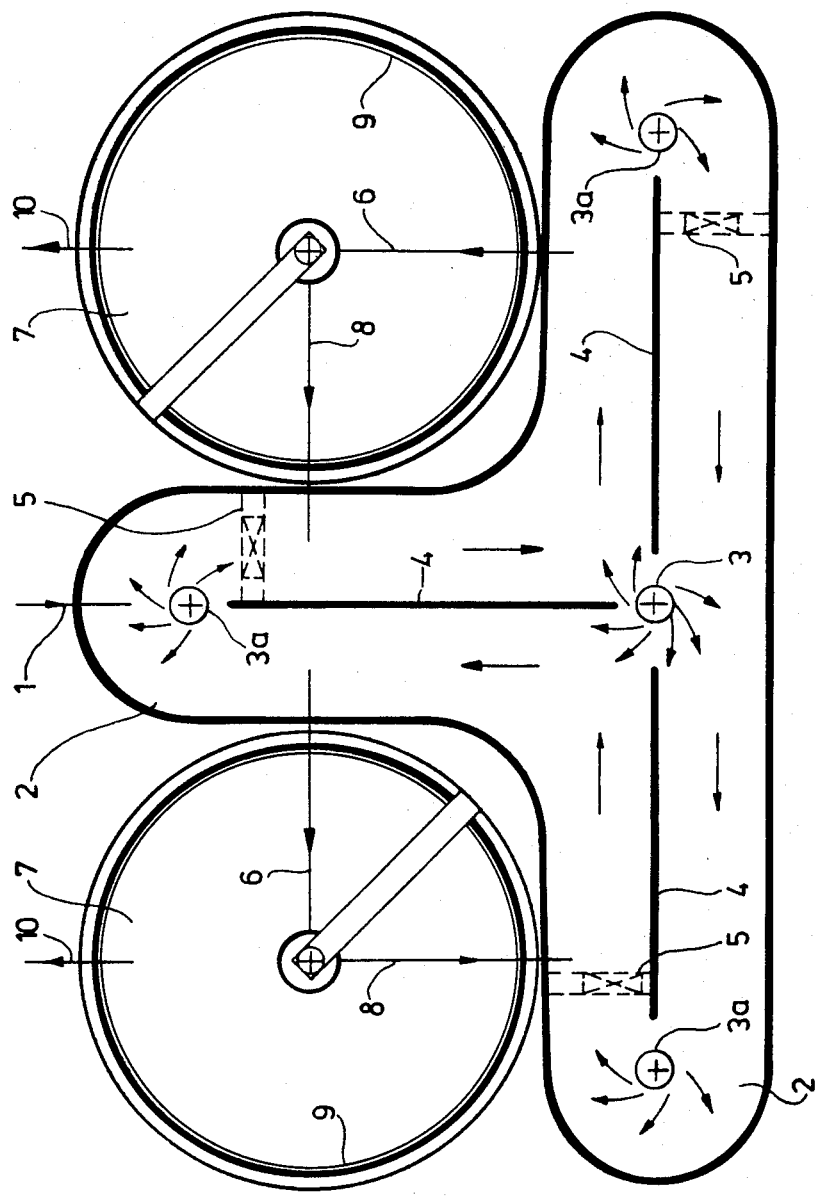
FIG. 1 is a circular top view of a preferred embodiment of the invention with the three channels basin and the secondary sedimentator.

Referring to FIG. 1, raw pretreated sewage arrives through the duct 1 into the space below the aerating wheel 3 (the aerator) with a vertical axis which is arranged in the aerating channel 2. The aerating wheel 3 continuously rotates and the speed of rotation is changed in compliance with the prevailing demand for oxygen. Changing of the speed of rotation of the aerating wheel 3 takes place automatically. Sewage divided by the partition walls 4 flows in the aerating channel 2, in which the horizontal motion is induced by the propellers 5 with a horizontal axle. Aerating wheels 3a with a vertical axle are arranged lying perpendicularly to each other at the outer ends of the partition walls 4. The wheels 3 rotate in compliance with the direction of the liquid flowing in the aerating channel 2, thus promoting the motion and turbulence of the liquid in the aerating channel 2. The liquid flows in the aerating channel 2 on a path recurring into itself. the mass of activated sludge is continuously led from the aerating channels 2 via the duct 6 into a secondary sedimentation basin 7 which has a circular ground-plan and is provided with oblique lamellae. The precipitated mass of the sludge is recirculated through a duct 8 into the aeration channel 2, while the sewage which was purified is discharged through the overfall edge 9, the overfall trough and the duct 10 from the secondary sedimentation basin 7.

The embodiment shown in FIG. 1 can have a reduced capacity since it contains but two channels 2 lying perpendicularly to each other. It is also possible to enlarge its capacity by having four channels, when such increase of capacity becomes necessary.

The arrangement shown in FIG. 1 may be advantageously connected to a sludge-condenser object resulting in favorable utilization of the space, subsequently to a technological (operational) building, whereby a block-like economical arrangement with a small space requirement may be obtained.

Figure 2:
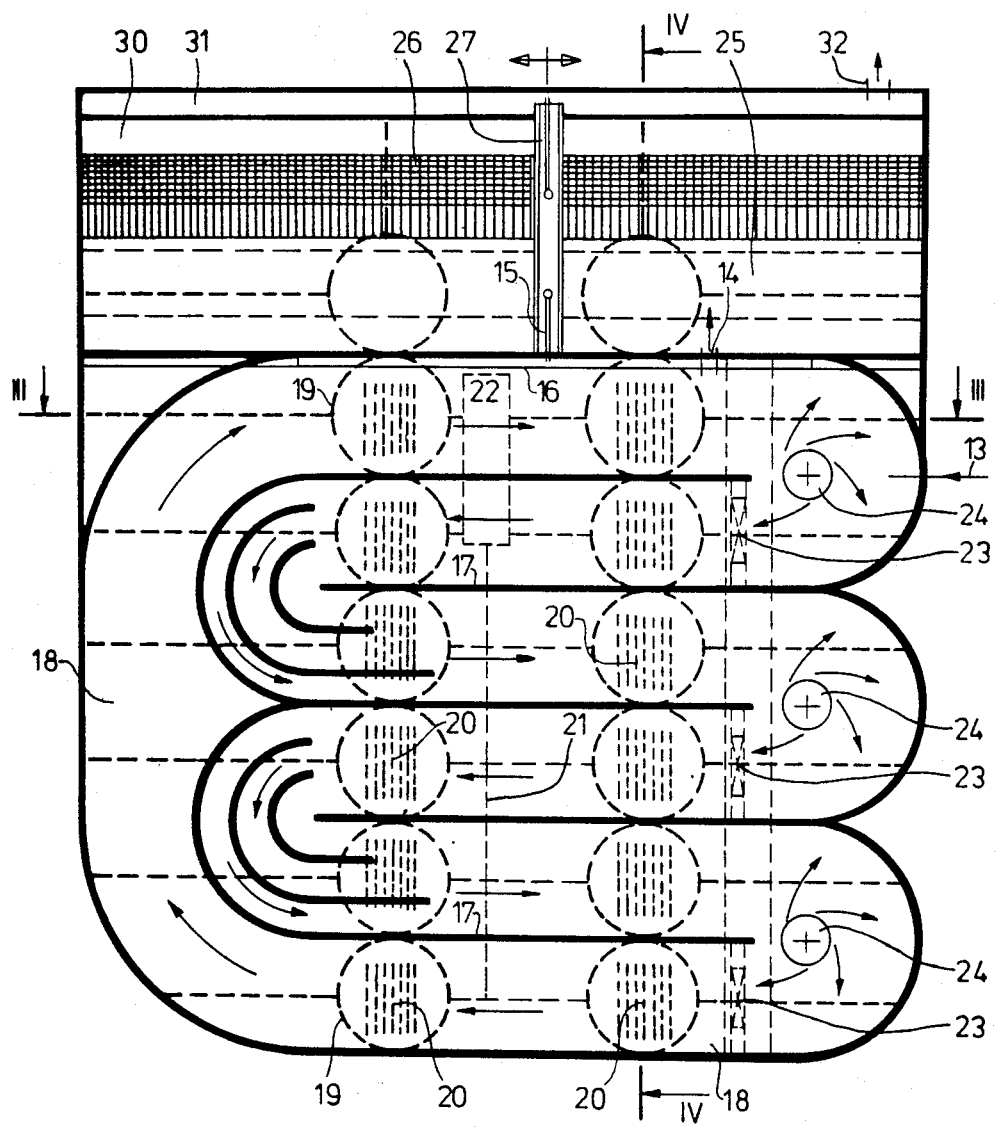
FIG. 2 is a top view of another preferred embodiment with a basin of the type Carrousel and the longitudinal secondary sedimentator.
Figure 3:
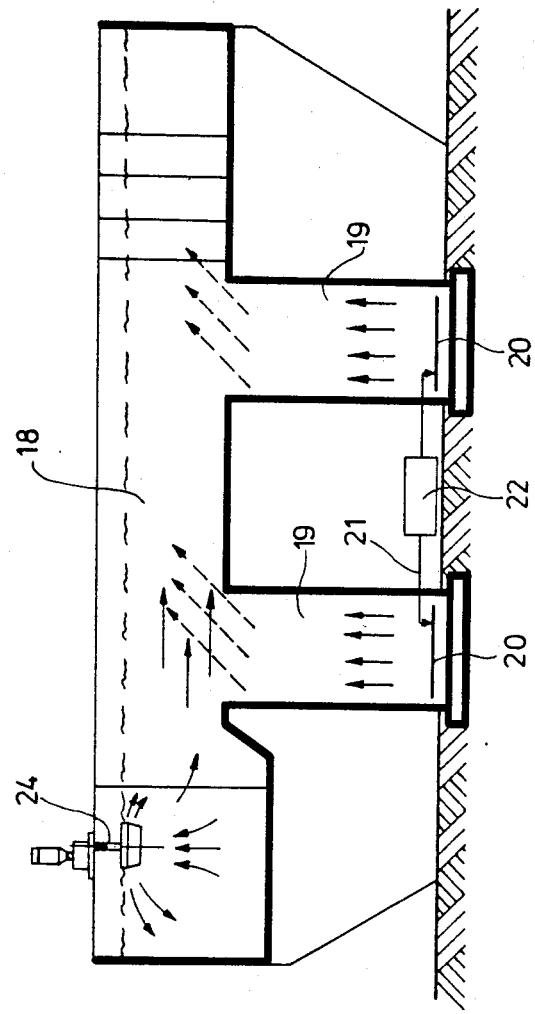
FIG. 3 is a section viewed line III—III of FIG. 2.
Figure 4:
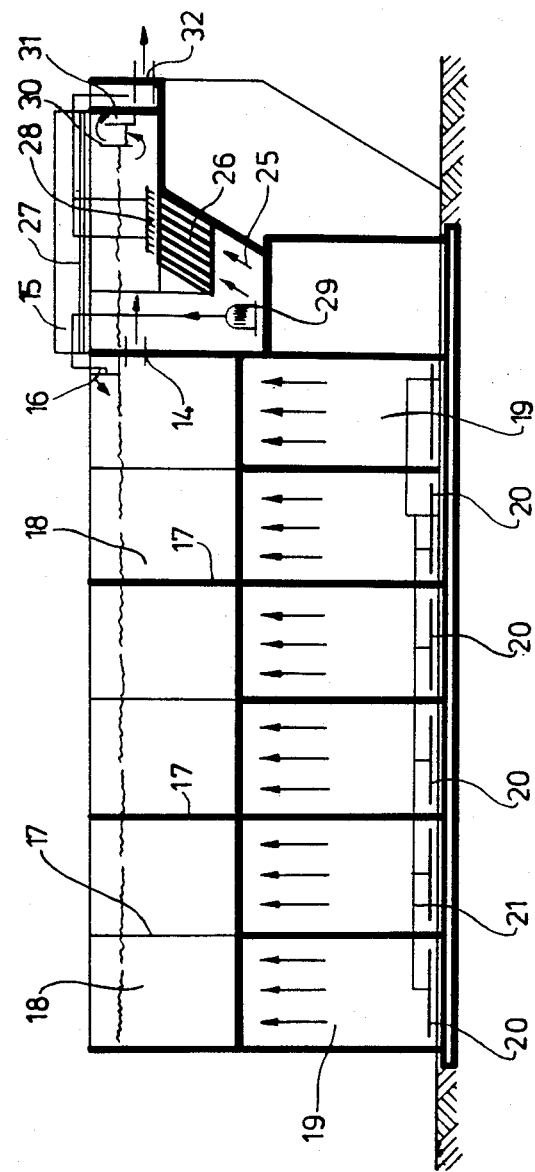
FIG. 4 is a section viewed at line IV—IV of FIG. 2.

In FIGS. 2 to 4 an additional version of the well-known aerator of the Carrousel-system is shown. The raw water arrives through a duct 13 and is discharged through a duct 14 into the secondary sedimentator, which is a longitudinal secondary sedimentator with lamellae in which the liquid streams in a transverse flow. The recirculated sludge returns through duct 15 into channel 16 or it leaves the system in the form of sludge excess. Aerating channels 18 are separated by means of partition walls 17 the liquid is allowed to stream in a horizontal direction in the aerating channels 18. Vertical aerating shafts 19 are built in periodically in an optimal mutual distances, in the direction of flow. Air injecting grids 20 are in the aerating shafts 19. A duct 21 is connected partly to the air-injecting grids 20 and partly to a compressor 22 which supplies the air.

The air (gas) ascending from the aerating shafts 19 arrives at the aerating channel 18 and advances in a horizontal direction resulting in the prolongation of the contact time and in an increased efficiency of oxygen transfer. The stream in the horizontal direction may be increased by the propellers 23 with the horizontal axles, in this case the aerating wheels 24, i.e. the aerators, with the vertical axle are not used.

The sedimentator 25 is provided with oblique lamellae 26. When the mixture to be sedimented is allowed to stream through the lamellae 26, a laminar flow and effective separation is achieved. The sedimentator 25 is provided with a bridge construction 27 carrying the lamella washer 28 (FIG. 4) of the type JET. An immersing pump 29 which serves to recirculate the sludge via the duct 15 is also suspended onto the bridge construction 27. The water which was purified and subjected to sedimentation flows below an overfall edge 30 and arrives at an overfall trough 31 from where it is discharged from the system through a duct 32.

As can be seen in FIG. 3, the bubbles globing from the aerating shaft 19 ascend in an oblique direction upwards under the influence of the horizontal flow in the aerating channels 18 thus prolonging the duration of oxygen transfer. The staying time of the air(gas) bubbles in the aerated mixture is 4–10 times longer than when ascension is in a straight direction.

Figure 5:
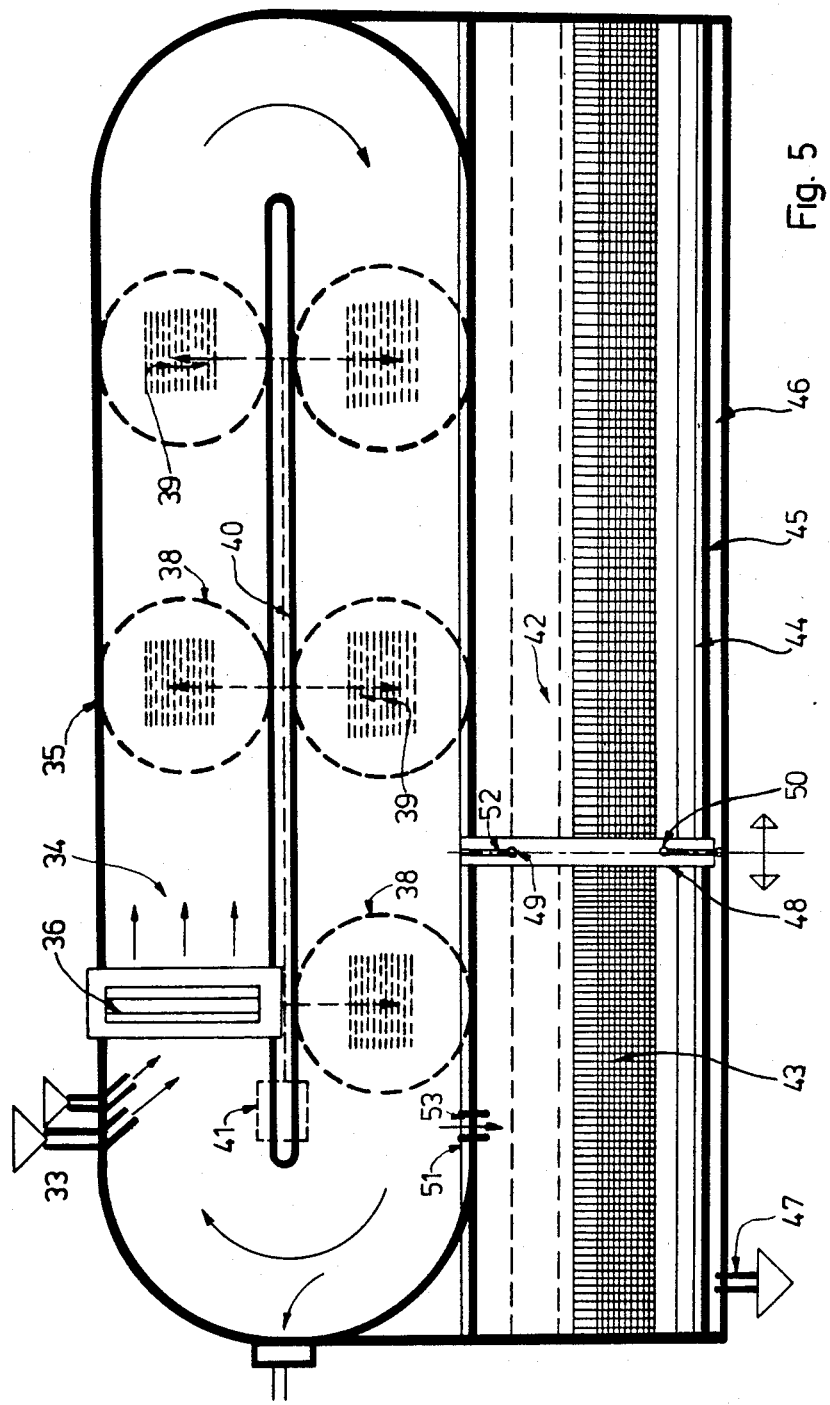
FIG. 5 is a top view of a further preferred embodiment with a longitudinal secondary sedimentator.

As can be seen in FIG. 4, channels 18 are arranged about the ground level and shafts 19 are formed as supporting pillars. In such a manner a space of considerable extent which can be economically utilized remains at disposal under the object. This is of utmost importance from the point of view of space saving. In FIG. 5 the embodiment of the invention shown is the known so-called oxidation trench. The raw sewage flows through a duct 33 to an aerating trench 34 which is confined by a bank slope 35 or the vertical outer wall. In the aerating trench 34 the horizontal flow is induced by the rotor or propeller 36 with a horizontal axle. The aerating trench 34 is divided into two parts by a partition wall. Similarly to the apparatus illustrated in FIGS. 2 to 4, the aerating shafts 38 are arranged below the aerating trench 34 and they each are provided with an air-injecting element 39 which is a grid. Said elements 39 are supplied with air from an air (gas) supplying device 41 through a duct 40. In the aerating trench 34 which forms a common space with the aerating shafts 38 the bubbles stream in a horizontal direction. The mass of water with the activated sludge is led from the aerating trench 34 into a secondary sedimentator 42 through a duct 53, from where the mass of sludge is recirculated via a duct 52. In the secondary sedimentator 42 oblique lamellae 43 are arranged where the water enters. When leaving said lamellae 43, the purified water streams below a guide wall 44 and leaves the system through an overfall edge 45, an overfall trough 46 and a duct 47. There is a movable bridge 48 above the secondary sedimentator 42 which carries a recirculating sludge pump 49 and a washer 50 for washing the lamellae 43. The sludge pump 49 recirculates the sludge into a distributing trough 51, while the sludge excess is discharged from the system through the duct 52.

Figure 6:
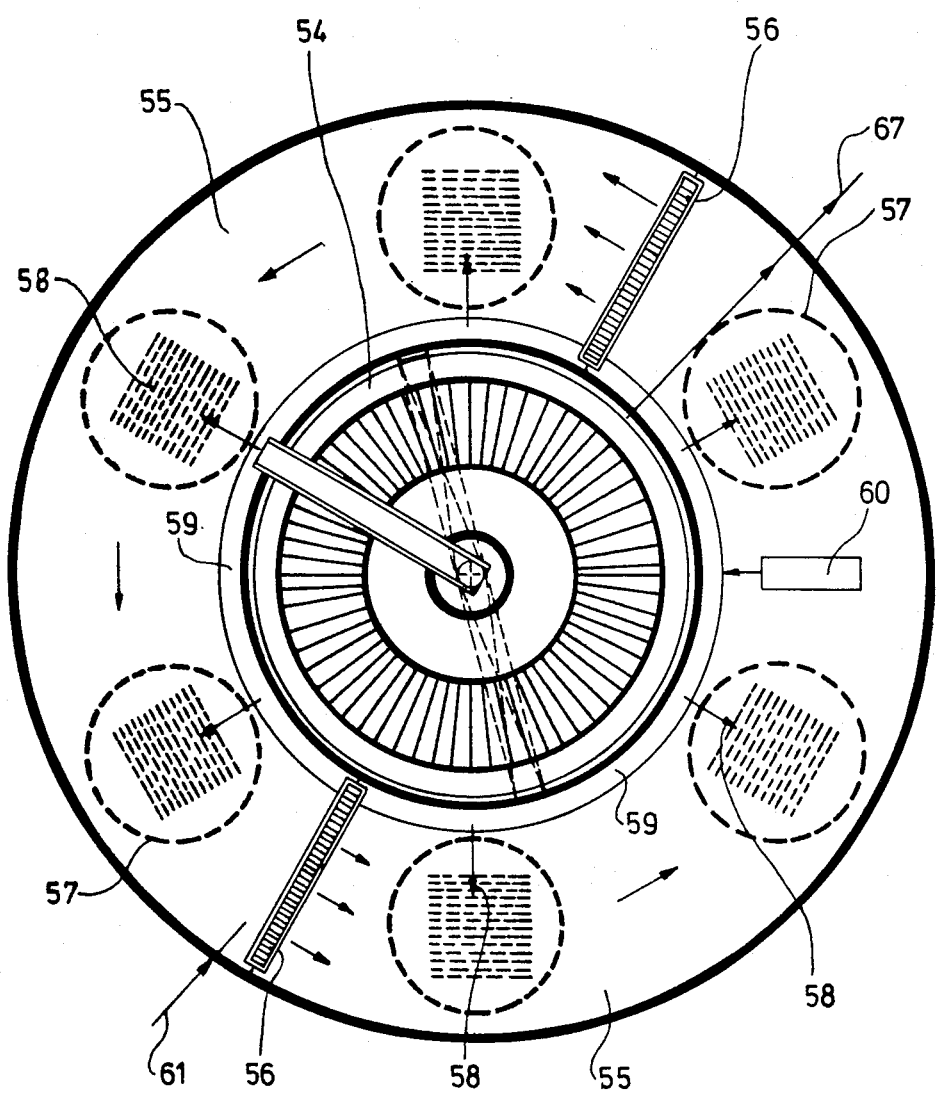
FIG. 6 is a top view of an embodiment of the invention having a circular ground plan.
Figure 7:
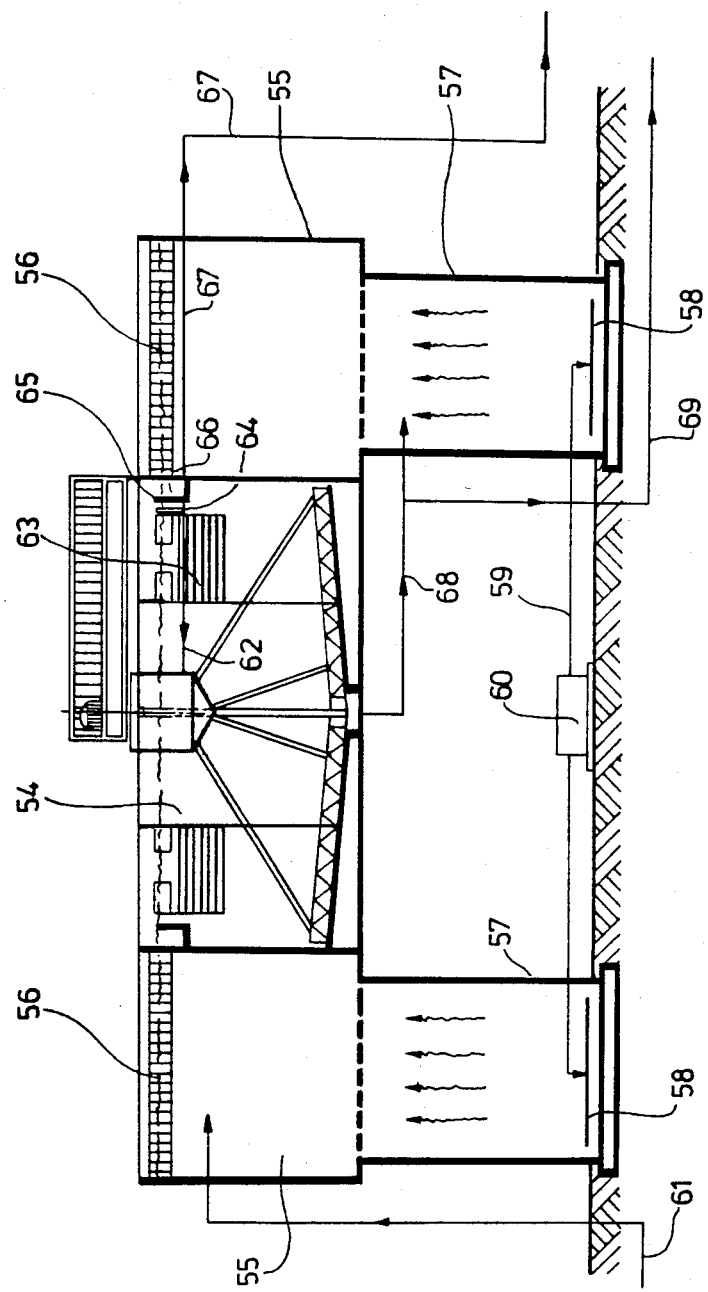
FIG. 7 is a cross section of the embodiment shown in FIG. 6.

FIGS. 6 and 7 show an embodiment with a circular ground plan. In this embodiment the central secondary sedimentator is encircled by an annular ring channel 55, in which aeration and flow in horizontal direction are ensured by means of the aeration rotors 56 with a horizontal axle. Vertical aerating shafts 57 are connected periodically to the aerating annular channel 55 and form therewith a continuous aerating space. In the aerating shafts 57 air-injecting elements grids 58 are connected to a device 60 for the air (gas) supply via a duct 59. With this embodiment the raw untreated water is led through a duct 61 to the aerating channel 55. From there it flows to the secondary sedimentator 54 through a duct 62 and the purified water leaves the system through a system 63 comprising oblique lamellae, under an overfall wall 64, via an overfall edge 65, an overfall trough 66 and a duct 67. The sludge sedimented in the secondary sedimentator 54 is either recirculated via a duct 68 into the ring channel 55 i.e. into the aerating shaft 57, or as a sludge excess it is led through the duct 69 into a sludge condenser, not shown, or it is stored or subjected to a further treatment. The aerating shafts 57 are formed as supporting pillars enabling the arrangement of the object above the ground level. The space formed in such a manner under the object can be well utilized for placing mechanical equipment e.g. compressors, sludge treatment equipment, contrifuges, etc. Accordingly, an utmost compact, block-like formation with an inconsiderable space requirement may be realized.

Figure 8:
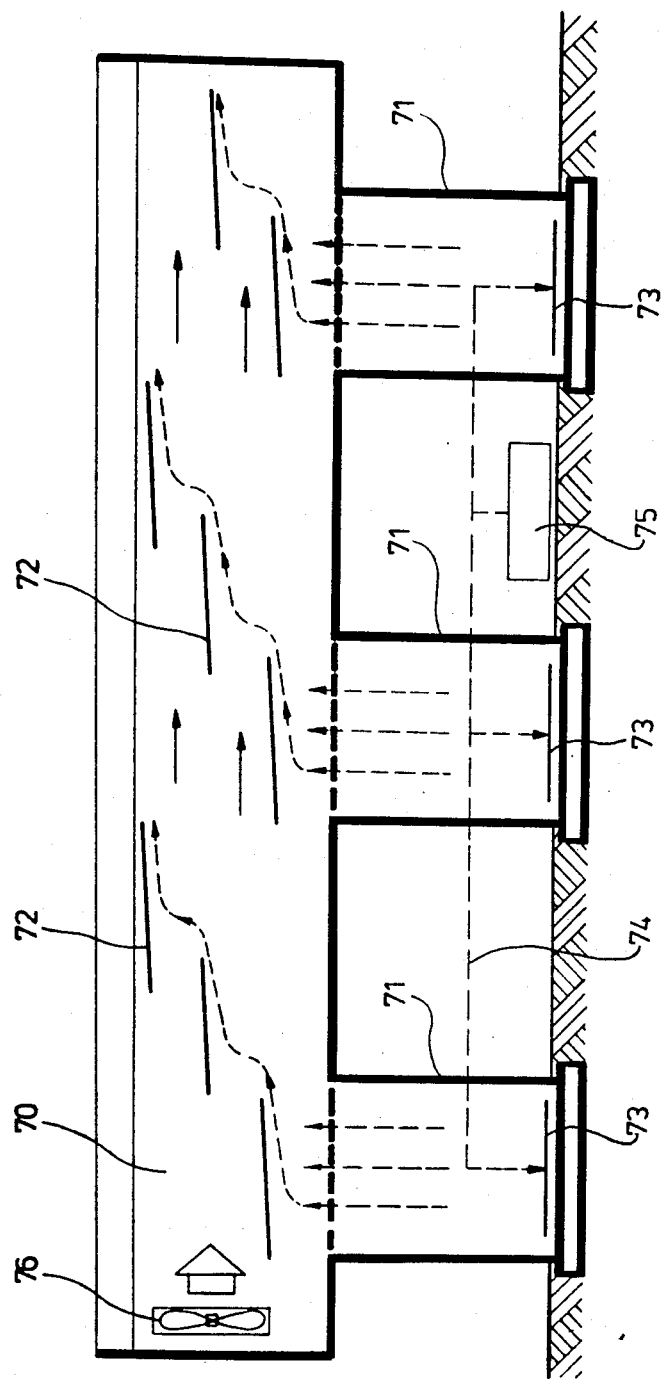
FIG. 8 is a longitudinal section of the apparatus of this invention.

Above aerating shafts 71 in the channel with a horizontal flow (see FIG. 8) are baffle plates 72. The baffle plates 72 rising in the direction of the stream should lie above each other in an overlapping manner. The air bubbles in the aerating shafts 71 bubbling therefrom ascend while wandering from plate to plate and in the course of their advance they come into contact with the baffle plates 72. In this way compared to unhindered vertical ascent, the staying time of the bubbles is about ten times longer, resulting in increased efficiency of the oxygen transfer. The oblique baffle plates 72 are made expediently of metal or a synthetic material do not influence the flow taking place in a horizontal direction, and at the same time a biological film is formed on their surface representing an active and useful surface which increases the efficiency of purification.

The angular position and height of the oblique baffle plates 72 can be expediently changed during operation. The oblique baffle plates 72 can be expediently used in any previously described apparatus, where liquid streams in a horizontal direction in the channel. This results in an increased economic efficiency. In each of the aerating shafts 71 there are air-injecting elements and a grid 73. These are supplied with air or gas, e.g., pure oxygen, by an air (gas) supply device 75 through a duct 74.

In the channel 70 flow in a horizontal direction is ensured by a propeller 76. In this way putting into motion (circulation), turbulence and supplying with oxygen are economically separated. Channel 70 is formed by a rectangle recurring in itself or a ring channel. Oxygen supply of the aerating shaft 71 takes place by an automatically controlled system in dependence of the prevailing oxygen requirement.

Figure 9:
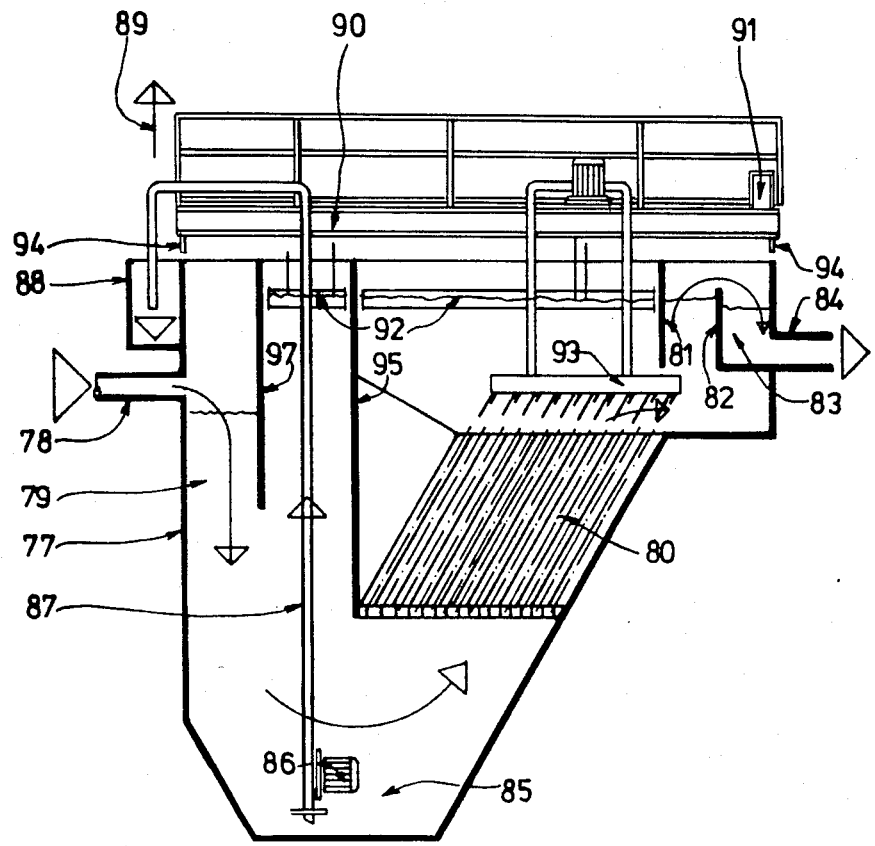
FIG. 9 is a cross section of an embodiment of the secondary sedimentator in a longitudinal arrangement, which can be advantageously used with the apparatus shown in FIGS. 2, 4 and 6.

The embodiments illustrated in FIG. 9 shows a secondary sedimentator 77 made in a compact manner and one vertical side thereof which can be connected to any aerating space with a vertical wall. The raw water (the activated sludge) arrives through a duct 78 at a sedimentation space 79, after having been subjected to a primary sedimentation. The sewage passes through a system 80 consisting of oblique lamellae arranged at an angle up to 60°, where secondary separation takes place. The sludge sedimentated in the lamella system 80 slides back to the sludge space 85. Sliding back is promoted by the side wall having a gradient of 60°. The sedimented sewage flows through the lamella system 80, under a guide wall 81 and arrives through an overfall edge 82 at an overfall trough 83. From there it is discharged from the system through the duct 84, as a purified and sedimented sewage. The sedimented sludge in the sludge space 85 in the bottom of the sedimentation space 79 is transferred by an immersible sludge pump 86 through a duct 87 into the sludge channel 88. From there it is either recirculated into the aerating space 79 or discharged as sludge excess from the space through the duct 89.

The sledge pump 86 and the duct 87 are mounted onto a movable bridge 90. The reciprocating movement of the bridge 90 in the length of the secondary sedimentator 77 is performed by a driving motor 91. The movable bridge 90 also carries a plate 92 for pushing off the floating sludge and the dredger blades, which can be considered as supplementary, auxiliary elements. The sludge sedimented on the lamella system 80 can be removed by a high pressure washer 93 of the type JET, which is also suspended onto the movable bridge 90. The bridge 90 travels on the rails 94 which are arranged on the extreme walls of the object. The oblique lamellae forming the lamella system 80 are arranged advantageously at an angle to 60°. This arrangement promotes sliding down of the sedimented sludge between the lamellae into the lower sludge space 85. Beside or instead of the sludge pump 86 any other system suitable for this purpose can be used, i.e. for the collection and removal of the sludge, so e.g. a vacuum suction system, pushing plates, suction pipes, etc. can be used. A partition wall 95 between the sedimentation space 79 and the space of the lamella system 80 separates the spaces performing diverse functions. The energy of the raw water streaming through a duct 78 is broken on the guide wall 97.

Figure 10:
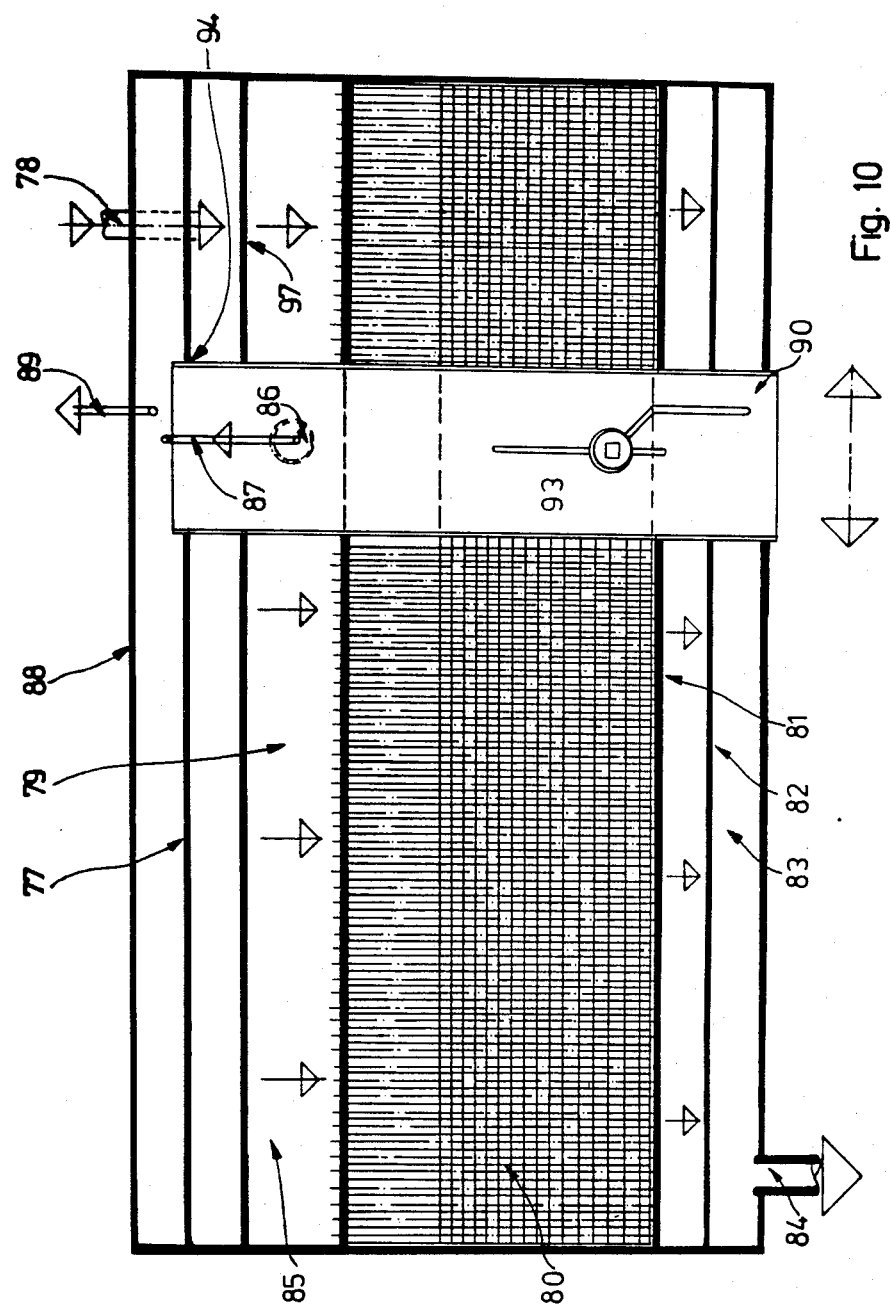
FIG. 10 is a top view of the embodiment shown in FIG. 9.

As is shown in FIG. 10, the secondary sedimentation basin 77 is longitudinally arranged. The secondary sedimentator 77 formed with the lamellae according to FIGS. 9 and 10 can be advantageously used with several embodiments according to the invention, where the objects have a longitudinal side wall. It seens to be most advantageous if the aerator and the secondary sedimentator are realized in one single object.

Figure 11:
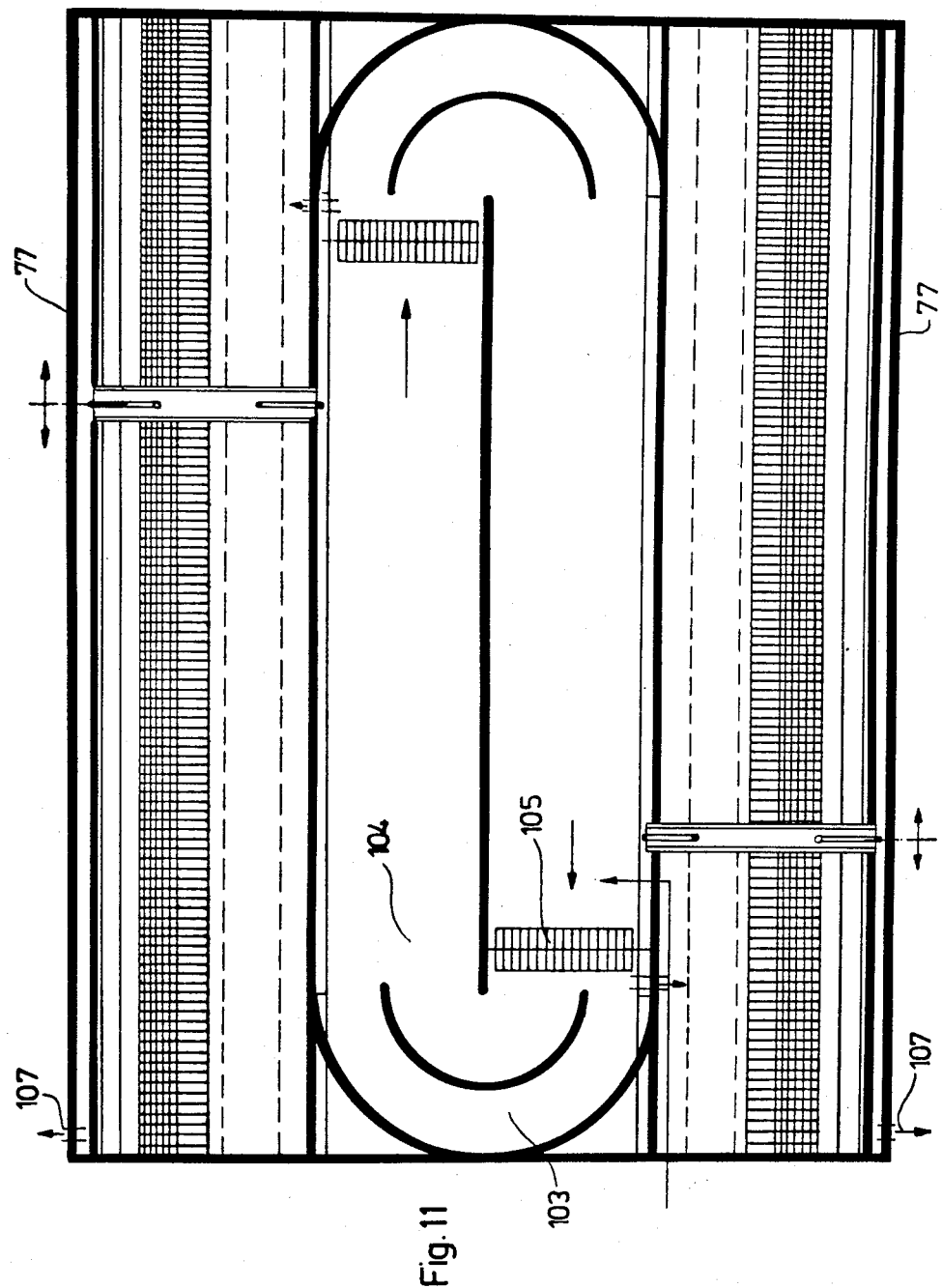
FIG. 11 is a top view of the embodiment of the invention with two longitudinal secondary sedimentators with lamellae.

FIG. 11 shows an example where the secondary sedimentation space 77 is built together with a longitudinally arranged aerator for the activated sludge. An aerator 103 for the activated sludge consists of the known longitudinal channels 104 recurring into itselves in which circulation of water, turbulence and oxygen transfer are ensured by means of aerating rotors 105. Both sides of the aerating channels 104 are connected to the longitudinal secondary sedimentator 77 provided with the lamellae, in which the liquid streams in crossflow and in which the sludge is sedimented in a similar way as in the equipment detailed in connection with FIGS. 9 and 10, while the purified sewage is discharged through a duct 107.

Figure 12:
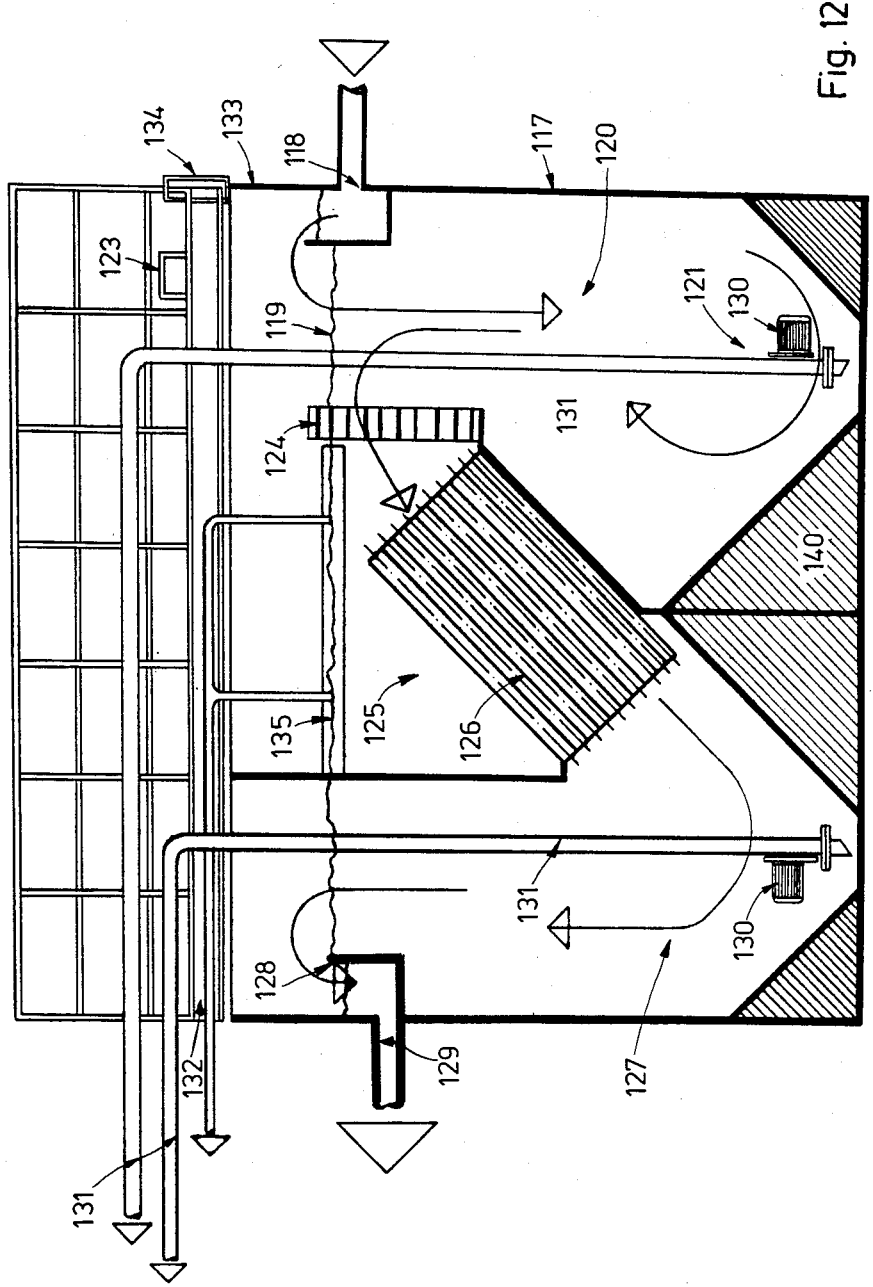
FIG. 12 is a cross section of the sedimentator with lamellae, in which the lamellae are arranged in the longitudinal central line of the basin.

The raw water, which may also contain sand and oil, is led into a sedimentator 117 (see FIGS. 12 and 13) through a duct 118. The raw water arrives through an overfall edge 119 to a sewage sedimentation space 120, where sedimentation takes place. The overfall edge 119 runs along the longitudinal wall of the basin of the sedimentator 117. In case, if the sewage contained sand, air may be blown into a space part 121. The air is delivered for this purpose by a compressor 123 mounted on a bridge 132. The pre-sedimented sewage arrives via the overfall grid 132 into the space 125 and streams through a separator 126 with the oblique lamellae. It then arrives at a second sedimentation space 127. From there it is discharged from the system through an overall trough 128 and a duct 129. In each of the first sewage sedimentation space 120 and the sedimentation space 127 there is a sludge pump 130 which is suspended onto the moving bridge 132 by means of a duct 131.

Figure 13:
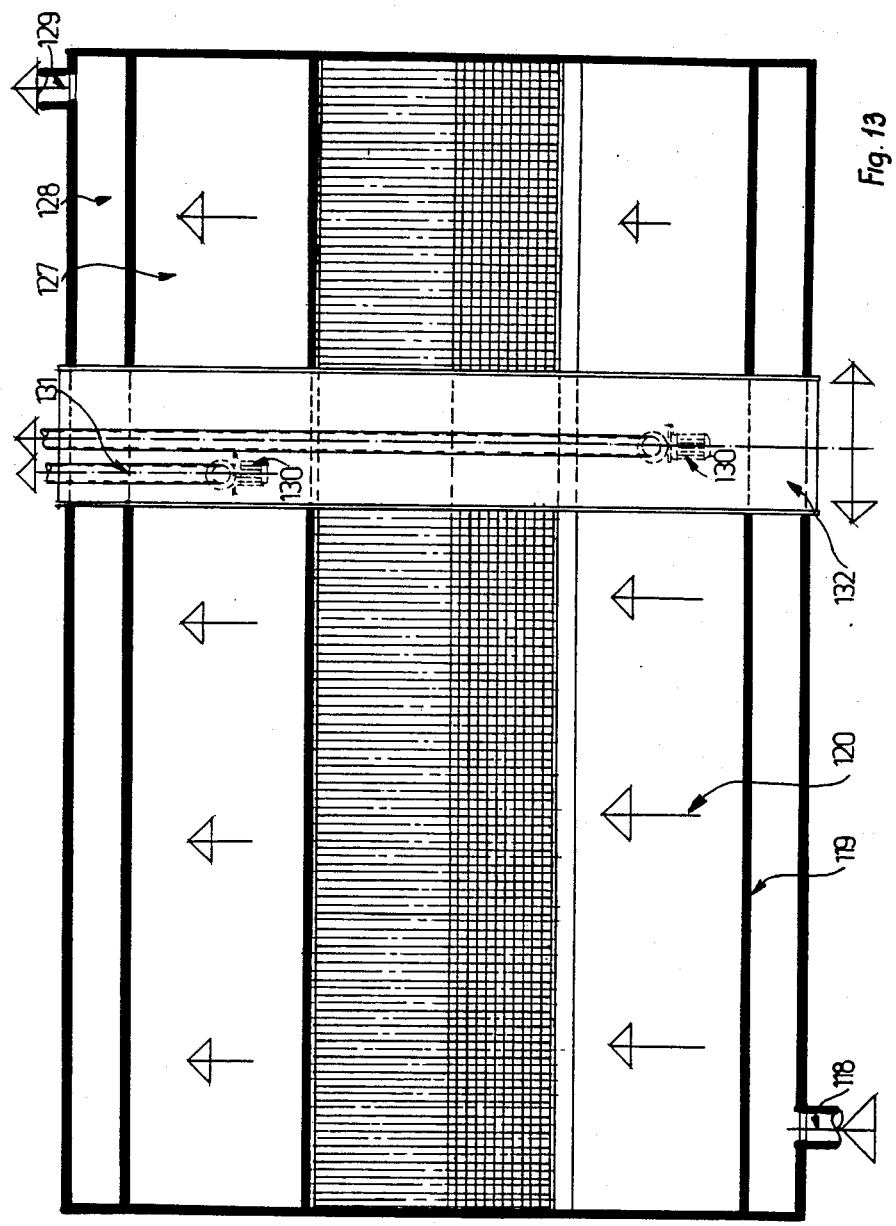
FIG. 13 is a top view of the embodiment shown in FIG. 12.

In FIG. 13 the movable bridge 132 travels along the longitudinal axis of the sedimentator 117 on a wheels 133 driven by a motor 134.

The oil collected on the surface of the water in the space 125 is skimmed or pushed off by a skimming device 135 and it is forwarded for further treatment, storage or use. In order to be able to promote condensation of the sludge sand on the bottom of the sedimentation spaces 120 and 127, concrete elements with a gradient about 45° to 60° are built in.

Figure 14:
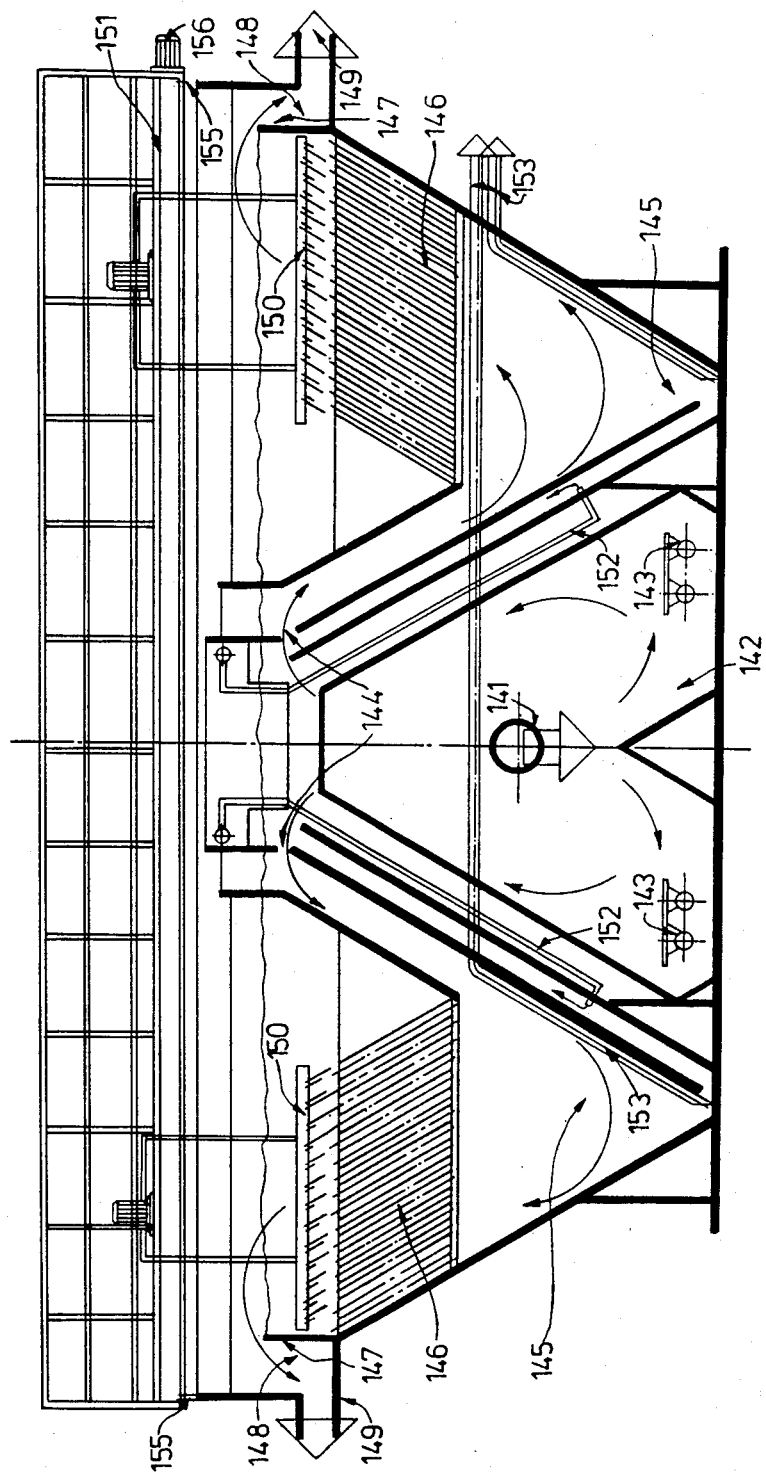
FIG. 14 is a section of the embodiment according to the invention, at which a lamella system each is arranged on both sides, in the length of the basin.

In FIG. 14 is an embodiment where the sedimentator with the oblique lamellae according to FIG. 9 is applied with a combined biological purification system for the purification of the activated sludge. The raw sewage arrives through a duct 141 to the aerating space 142, wherein supply with oxygen and turbulence are ensured by bubbling with the aid of air injectors 143. The mixture with the activated sludge streams by the force of gravity from the aerating space 142, through the opening 144 into the secondary sedimentator 145. Between the oblique lamellae 146 arranged therein, secondary sedimentation takes place. The sludge slides back into the lower space, while the purified sewage is discharged from the system through an overfall edge 146, a channel 148 and a duct 149. The sludge sedimented between the oblique lamellae 146 is periodically removed by means of a high pressure washer 150 of the type JET, which is mounted onto a movable bridge 151. The bridge 151 performs an automatically controlled reciprocating motion parallel with the longitudinal axis of the object. From the secondary sedimentation space 145 the sludge sedimented is transferred by the so-called Mammoth-pump provided with an air duct 152 into the aerating space 142 through the channel 154, while the sludge excess is discharged through the duct 153.

The oblique lamellae increase the efficiency of purification, accordingly specifically the loading capacity may be increased by 50–100%. The bridge 151 travels on the top of the object, on the rail on the longitudinal confining wall thereof, while automatic moving is provided by a driving motor 156.

The bridge 151 of the combined object according to FIG. 14, the top view thereof shown in FIG. 15 travels parallel with the longitudinal axis of the object and ensures the periodic regeneration i.e. cleaning of the oblique lamellae 146. The combined object with the secondary sedimentation system provided with the lamellae yields a most economical solution with an inconsiderable space requirement.

I claim:

1. Apparatus for the treatment of liquid household and industrial sewages containing contaminants to effect biological purification, aeration and sedimentation comprising a shaped liquid receiving basin having therein an aerating wheel which consists of cross flow aerating channels extending radially from said wheels; said channels separated by at least one partition wall being perpendicular to to each other and forming a path returning into itself forming parallel closed aerating channels and a duct for receiving said liquid sewage and at least one propeller or rotor with axle for moving said sewage through said aerating channels, said propeller or rotor being downstream in the direction of flow in each channel behind the aerating wheel, said aerating channels having therein at least one aerator with axle and at least one fixed air blower for aerating said liquid sewage; wherein under said aerating channels are vertical aerating shafts, the depth of which is between 1 and 35 meters forming a common space and which with said aerating channels and vertical aerating shafts comprise air-injecting grids in the bottom area of said shafts for injecting air into said sewage through ducts; and wherein there are secondary sedimenters with oblique lamallae which when viewed from the top are circular, said lamallae being connected directly to said secondary sedimenters by ducts through which the aerated sewage flows in transverse flow from said aerating channels and from which the treated sewage is discharged through outflow means.

2. Apparatus of claim 1 wherein said aerating wheel is centrally disposed and has means for rotating it which are responsive to the prevailing oxygen requirements.

3. Apparatus of claim 1 wherein aerating wheels with a vertical axle are in the basin of a Carrousel-system at the ends of the said at least one partition wall of the parallel aerating channels connected in series, propellers with a horizontal axle in the liquid flow direction in the channels behind said wheels; and connected to the aerating channels, longitudinally arranged secondary sedimenter with oblique lamellae wherein the liquid flow is in a transverse direction.

4. Apparatus of claim 1 wherein said vertical aerating shafts are supporting pillars and said apparatus extends above ground level to a height corresponding to the length of said shafts.

5. Apparatus of claim 1 wherein the depth of the aerating shafts is between 3 and 10 meters.

6. Apparatus of claim 1 wherein baffle plates above the aerating shafts in the aerating channels extend upwards in the direction of the flow in such a manner that in their vertical projection they overlap.

7. Apparatus of claim 6 wherein the angle of inclination of the baffle plates is between 1 degree and 45 degrees.

8. Apparatus of claim 7 wherein the angle of inclination of the baffle plates is between 2 degrees and 5 degrees.

9. Apparatus of claim 6 wherein the baffle plates are of the same height as the aerating channels.

10. Apparatus of claim 6 wherein the baffle plates are less than the height of the aerating channels.

11. Apparatus of claim 6 wherein the baffle plates are made of a material selected from the group consisting of steel, aluminum, PVC, polyethylene, polypropylene and polystyrene.

12. Apparatus of claim 6 wherein the surface of the baffle plates is embossed.

13. Apparatus of claim 6 wherein the angle of inclination of the baffle plates can be changed during operation.

14. Apparatus of claim 1 wherein the axle of said aerator is horizontal.

15. Apparatus of claim 1 wherein the axle of said aerator is vertical.

16. Apparatus of claim 1 wherein said secondary sedimenters with oblique lamellae are arranged longitudinally with respect to each other and each contains an immersing pump for recirculating the liquid sewage therethrough via ducts.

17. Apparatus of claim 1 wherein the shape of said liquid receiving basin is circular.

18. Apparatus of claim 1 wherein the shape of said liquid receiving basin is quadratic.

19. Apparatus of claim 1 wherein the shape of said liquid receiving basin is elongated oblong.

20. Apparatus of claim 1 wherein the axles of said propellers or rotors are horizontal.

21. Apparatus of claim 1 wherein the axles of said propellers or rotors are vertical.

* * * * *